US012775901B2

(12) United States Patent

Nagao et al.

(10) Patent No.: US 12,775,901 B2
(45) Date of Patent: Oct. 27, 2026

(54) PRODUCT RIGHTS MANAGEMENT SYSTEMS AND METHODS USING SECURE TAGS AND CRYPTOGRAPHIC TOKENS

(71) Applicant: Intertrust Technologies Corporation, Berkeley, CA (US)

(72) Inventors: Yutaka Nagao, San Jose, CA (US); Talal Shamoon, Berkeley, CA (US); Albhy Galuten, Santa Monica, CA (US); Michael Ma, Sudbury, MA (US)

(73) Assignee: Intertrust Technologies Corporation, Berkeley, CA (US)

( * ) Notice: Subject to any disclaimer, the term of this patent is extended or adjusted under 35 U.S.C. 154(b) by 39 days.

(21) Appl. No.: 18/394,790

(22) Filed: Dec. 22, 2023

(65) Prior Publication Data

US 2024/0211847 A1 Jun. 27, 2024

Related U.S. Application Data

(60) Provisional application No. 63/435,190, filed on Dec. 23, 2022.

(51) Int. Cl.
*G06Q 10/083* (2024.01)
*G06K 19/077* (2006.01)

(52) U.S. Cl.
CPC ..... *G06Q 10/083* (2013.01); *G06K 19/07758* (2013.01)

(58) Field of Classification Search
CPC ..... H04L 9/3271; H04L 9/3247; G06K 19/07; G06F 21/60; G06F 21/35
(Continued)

(56) References Cited

U.S. PATENT DOCUMENTS

2010/0198873 A1* 8/2010 Falk ........................ G06F 21/35 707/E17.005
2022/0366061 A1* 11/2022 Spivack ................ H04L 9/3271

FOREIGN PATENT DOCUMENTS

KR 102438223 9/2022
KR 102438223 B1 * 9/2022 ............ G06F 21/60
(Continued)

OTHER PUBLICATIONS

Hwa et al., "Integrated Management System For Non-Fungible Token Generation, Distribution And Trading Based On Genetic Data And Method Thereof", (Sep. 1, 2022).*
(Continued)

*Primary Examiner* — Olusegun Goyea
(74) *Attorney, Agent, or Firm* — John P. Davis; Thayne and Davis LLC

(57) ABSTRACT

Embodiments of the disclosed systems and methods may facilitate various rights management associated with a variety of physical products. In various embodiments, information may be securely associated with products and/or digital assets associated with products using secure tags, which may comprise near field communication tags. Information associated with the secure tags may be associated with non-fungible tokens, which may allow for management of rights related to products associated with the tags using blockchain and/or other trusted ledger services. In this manner, non-fungible token management paradigms may be used to manage, implement, and/or otherwise enforce rights associated with physical products in a variety of variety of applications, use cases, and/or contexts.

19 Claims, 16 Drawing Sheets

(58) Field of Classification Search
USPC ........................................................ 707/784
See application file for complete search history.

(56) References Cited

FOREIGN PATENT DOCUMENTS

| | | | | |
|---|---|---|---|---|
| WO | 2020254995 | | 12/2020 | |
| WO | WO-2020254995 A1 | * | 12/2020 | ............. G06K 19/07 |

OTHER PUBLICATIONS

Aftab et al., "Towards A Distributed Ledger Based Verifiable Trusted Protocol For VANET", May 20, 2021.*
International Patent Application PCT/US2023/085782, ISR, dated Mar. 26, 2024 (4 pgs).
International Patent Application PCT/US2023/085782, WO, dated Mar. 26, 2024 (4 pgs).
Machine Generated English Language Translation of KR102438223, Integrated Management System for Non-Fungible Token Generation, Distribution and Trading Based on Genome Data and Method Thereof, Oct. 31, 2009 (1 pg).
Aftab Muhammad Usman et al, Towards A Distributed Ledger Based Verifiable Trusted Protocol For VANET, May 20, 2021 (1 pg).

* cited by examiner

Print Managed Asset

PRODUCT RIGHTS MANAGEMENT SYSTEMS AND METHODS USING SECURE TAGS AND CRYPTOGRAPHIC TOKENS

CROSS-REFERENCE TO RELATED APPLICATIONS

This application claims the benefit of priority under 35 U.S.C. § 119(e) to U.S. Provisional Application No. 63/435,190, filed Dec. 23, 2022, and entitled "PRODUCT RIGHTS MANAGEMENT SYSTEMS AND METHODS USING SECURE TAGS AND CRYPTOGRAPHIC TOKENS," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY OF THE INVENTION

The present disclosure relates generally to systems and methods for managing products, which may be embodied as physical and/or digital products, and associated rights. More specifically, but not exclusively, the present disclosure relates to systems and methods for managing products using secure tags and non-fungible tokens ("NFTs").

Rights associated with and/or otherwise related to products may be managed in a number of ways. For example, products and/or associated rights may be managed using identification information that may be securely associated with products (e.g., physically affixed) and/or associated digital assets. In some circumstances, the identification information may be unique to a product such as, for example, a product serial number. Rights associated with a product may be bound to the identification information and be used to manage the product in a variety of applications, use cases, and/or contexts. Management of such rights, however, introduces a number of challenges, including the potential for creation of counterfeit products and more cumbersome validation methods to validate and/or otherwise authenticate genuine products.

Consistent with embodiments disclosed herein, identification information may be securely associated with products and/or digital assets associated with products using secure tags, which in certain instances herein may be referred to simply as tags. In certain embodiments, a secure tag may comprise a near field communication ("NFC") tag physically embedded, integrated, and/or otherwise affixed to a product, although other types of secure tags may also be used. In further embodiments, a watermark, which may be physically embedded and/or otherwise printed, integrated, and/or otherwise affixed to a product may be used. In some embodiments, a digital watermark may be used (e.g., a digital watermark implemented using an RFID tag and/or the like) associated with a digital asset. In certain embodiments, a watermark may provide information (e.g., identification information) allowing for a reader system to interact with a digital tag managed by a service to provide tag operability consistent with various disclosed embodiments. It will be appreciated that a variety of other techniques may be used for securely and potentially indelibly) associating a unique identifier and/or other information with a product.

In various disclosed embodiments, secure tags, watermarks (and/or associated digital tags), and/or associated information may be securely associated with one or more NFTs, which may allow for management of rights related to products associated with the secure tags, watermarks, and/or other information using NFT management techniques. An NFT is a type of cryptographic token managed using a trusted distributed ledger (e.g., a blockchain ledger) that may represent a product and/or asset. NFTs may be used in a variety of contexts, with applications varying from simple digital asset transactions to complex collateral loans. In various disclosed embodiments, an NFT may be associated with a product and/or rights associated with a product.

Consistent with embodiments disclosed herein, NFT management paradigms may be used to manage, implement, and/or otherwise enforce rights associated with products in a variety of variety of applications, use cases, and/or contexts. In certain embodiments, marketplace services may be employed that interface with token rights management ("TRM") services providing tag and/or watermark management, trusted ledger management, and/or digital rights management ("DRM") services. Such a marketplace service may allow rightsholders to list products and/or associated rights for sale, rent, and/or the like, facilitate transactions between parties in connection with such rights, and/or ensure that transacted rights are securely transferred and recorded as appropriate.

In various embodiments disclosed herein, products may comprise physical products. A physical product may comprise a variety of physical items such as, for example and without limitations, a shoe, a handbag, a consumer electronic device, physical artistic works, sports memorabilia, physical items with historical significance, limited edition products, and/or the like. In further implementations, a product may comprise a digital product such as digital content, which in some embodiments may comprise a digital description of and/or other information that may be used to generate a physical product such as 3D printing instructions. In yet further embodiments, products may comprise a suitable combination of physical and digital products. It will be appreciated that embodiments of the disclosed systems and methods may be used in connection with managing a wide variety of products and/or associated rights, and that any specific examples of products described herein are used for purposes of illustration and explanation and are not to be viewed as limiting.

In various disclosed embodiments, trusted databases, ledgers, and/or the like (which may be generally referred to herein as "trusted ledgers," "blockchains," and/or variations of the same), may be used to record and/or otherwise manage various assertions associated with NFTs and/or associated products. In some embodiments, such databases and/or ledgers may be distributed, and may be referred to herein as trusted immutable distributed assertion ledgers ("TIDALs") and/or variations of the same. In some embodiments, trusted ledgers may comprise blockchain ledgers.

Databases and/or ledgers may, in various embodiments, be public, private, and/or a combination thereof. In certain embodiments, a TIDAL may comprise a public indelible distributed database ("PIDD"). TIDALs consistent with various aspects of the disclosed embodiments may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

BRIEF DESCRIPTION OF DRAWINGS

The inventive body of work will be readily understood by referring to the following detailed description in conjunction with the accompanying drawings, in which.

DETAILED DESCRIPTION OF THE INVENTION

Figure 1A:
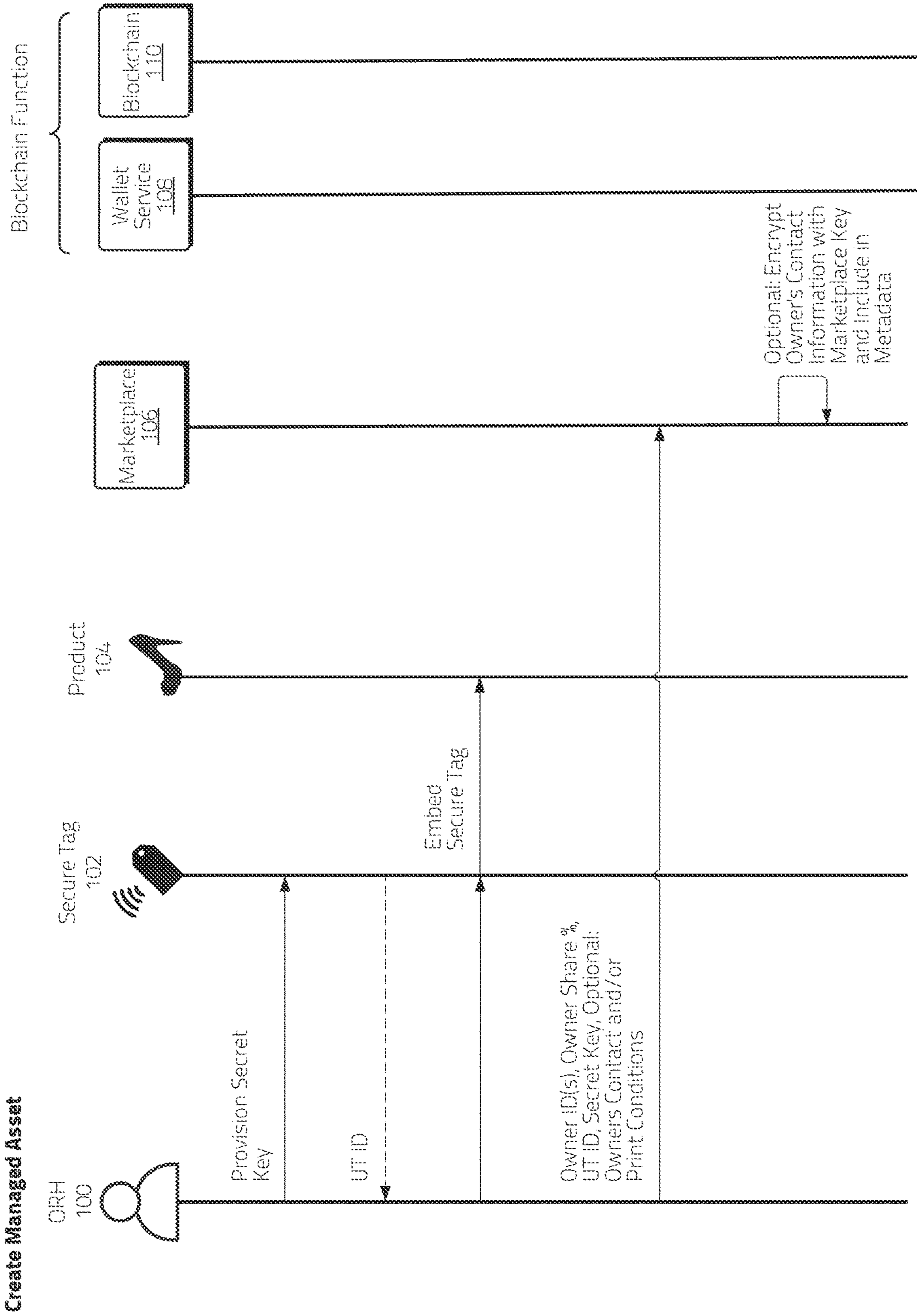
FIG. 1A illustrates a first part of a non-limiting example of a process for a creating a managed asset consistent with certain embodiments disclosed herein.
Figure 1B:
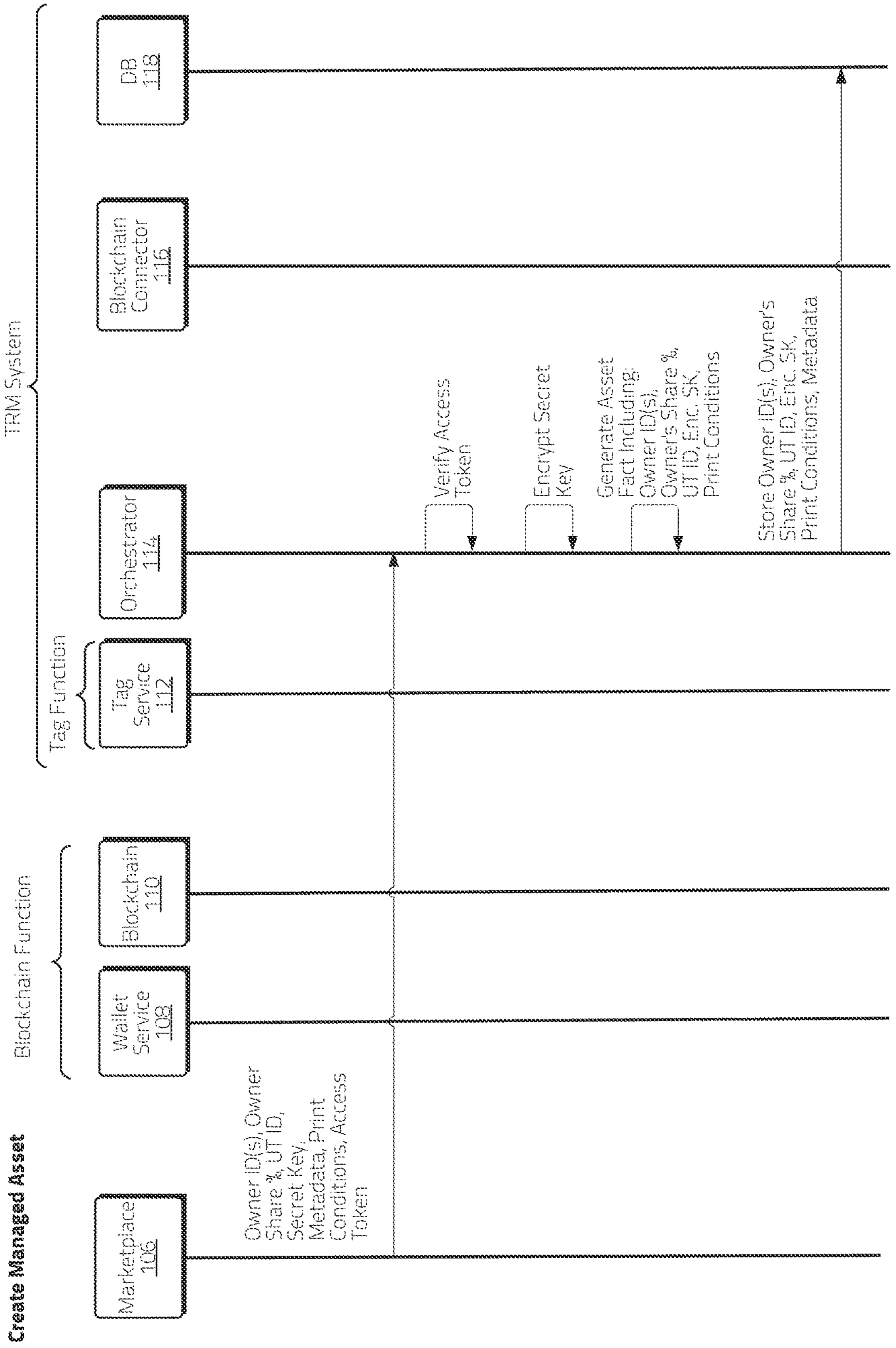
FIG. 1B illustrates a second part of a non-limiting example of a process for a creating a managed asset consistent with certain embodiments disclosed herein.
Figure 1C:
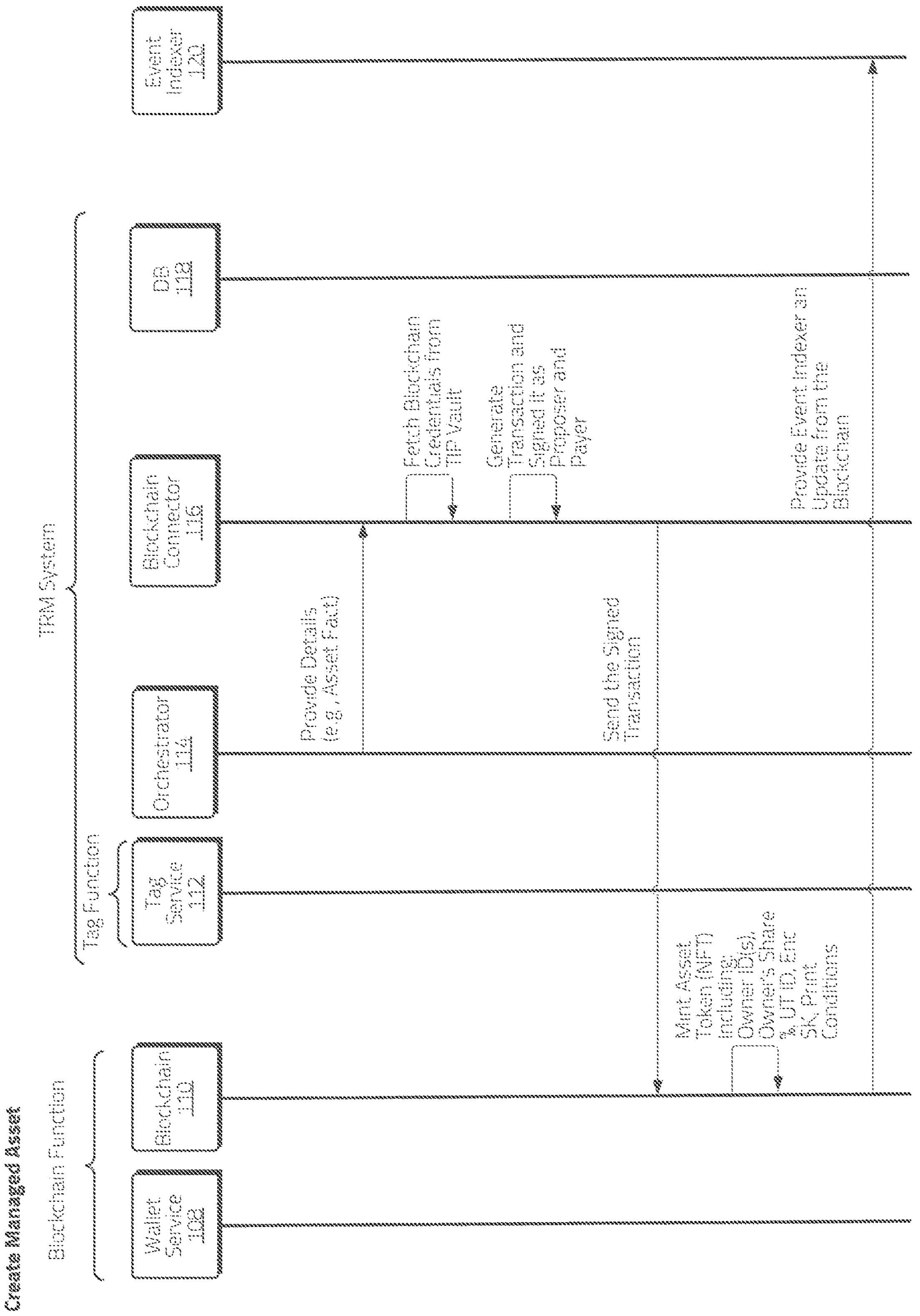
FIG. 1C illustrates a third part of a non-limiting example of a process for a creating a managed asset consistent with certain embodiments disclosed herein.
Figure 1D:
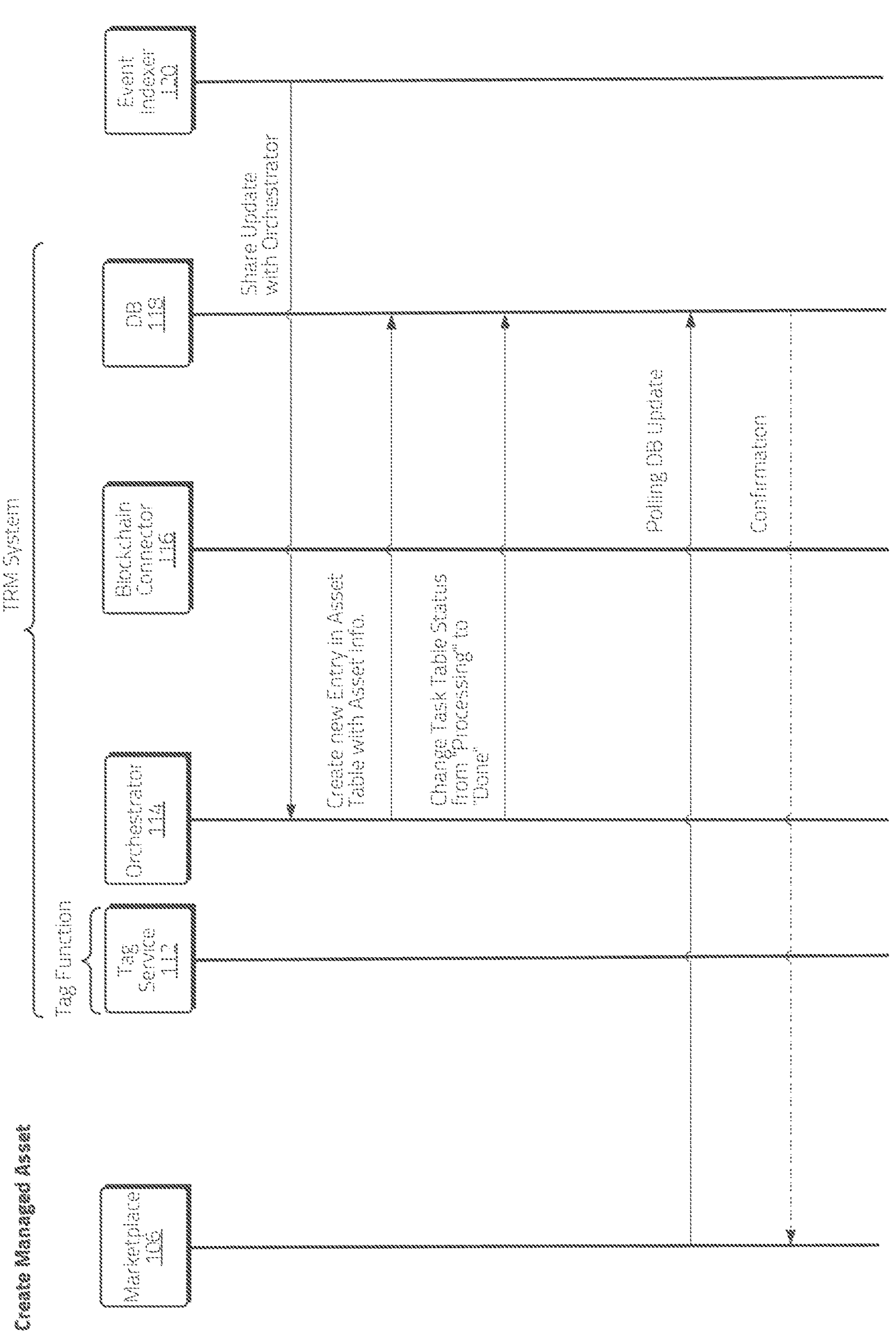
FIG. 1D illustrates a fourth part of a non-limiting example of a process for a creating a managed asset consistent with certain embodiments disclosed herein.
Figure 2A:
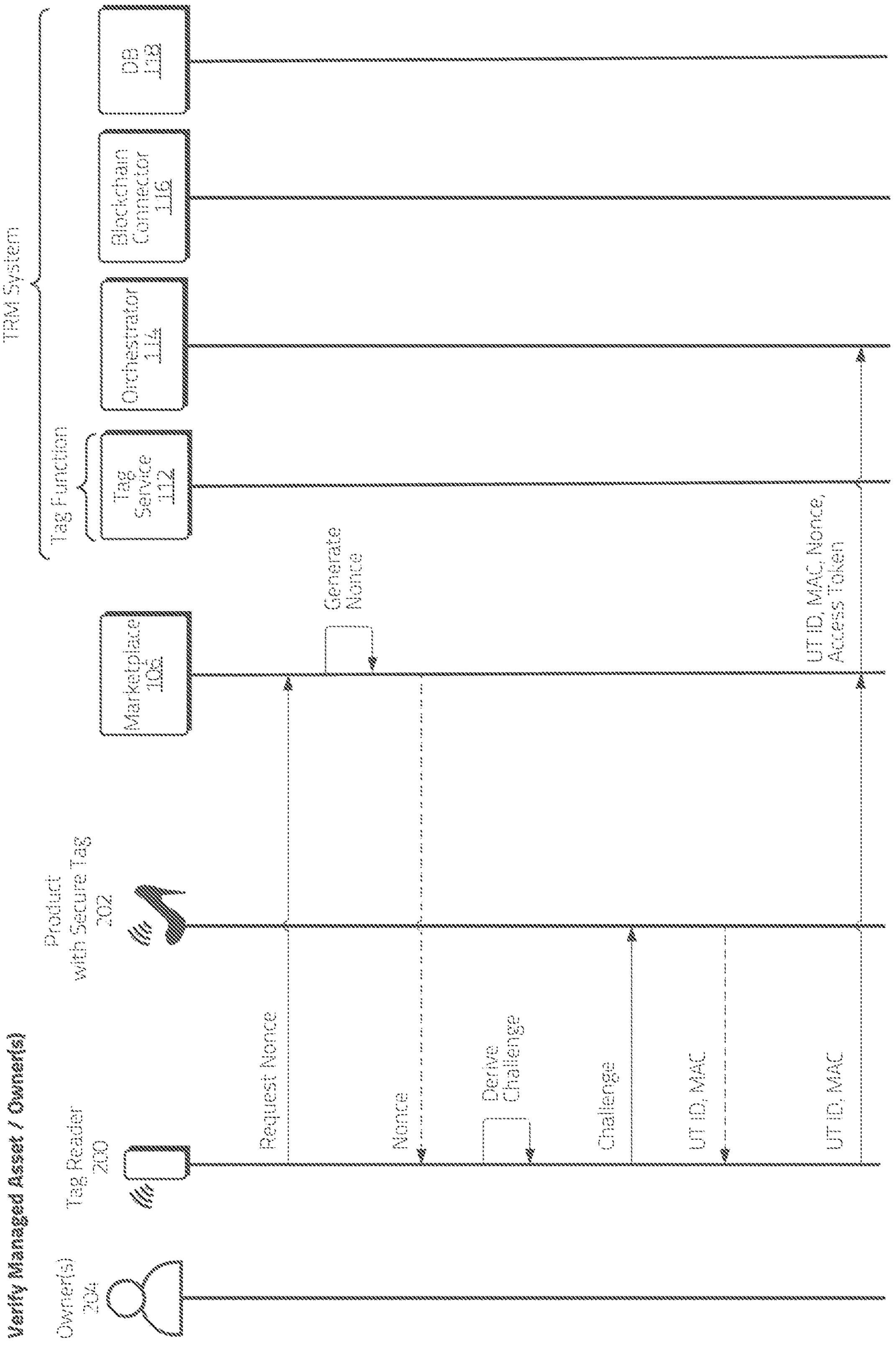
FIG. 2A illustrates a first part of a non-limiting example of a process for verifying a managed asset and/or its ownership consistent with certain embodiments disclosed herein.
Figure 2B:
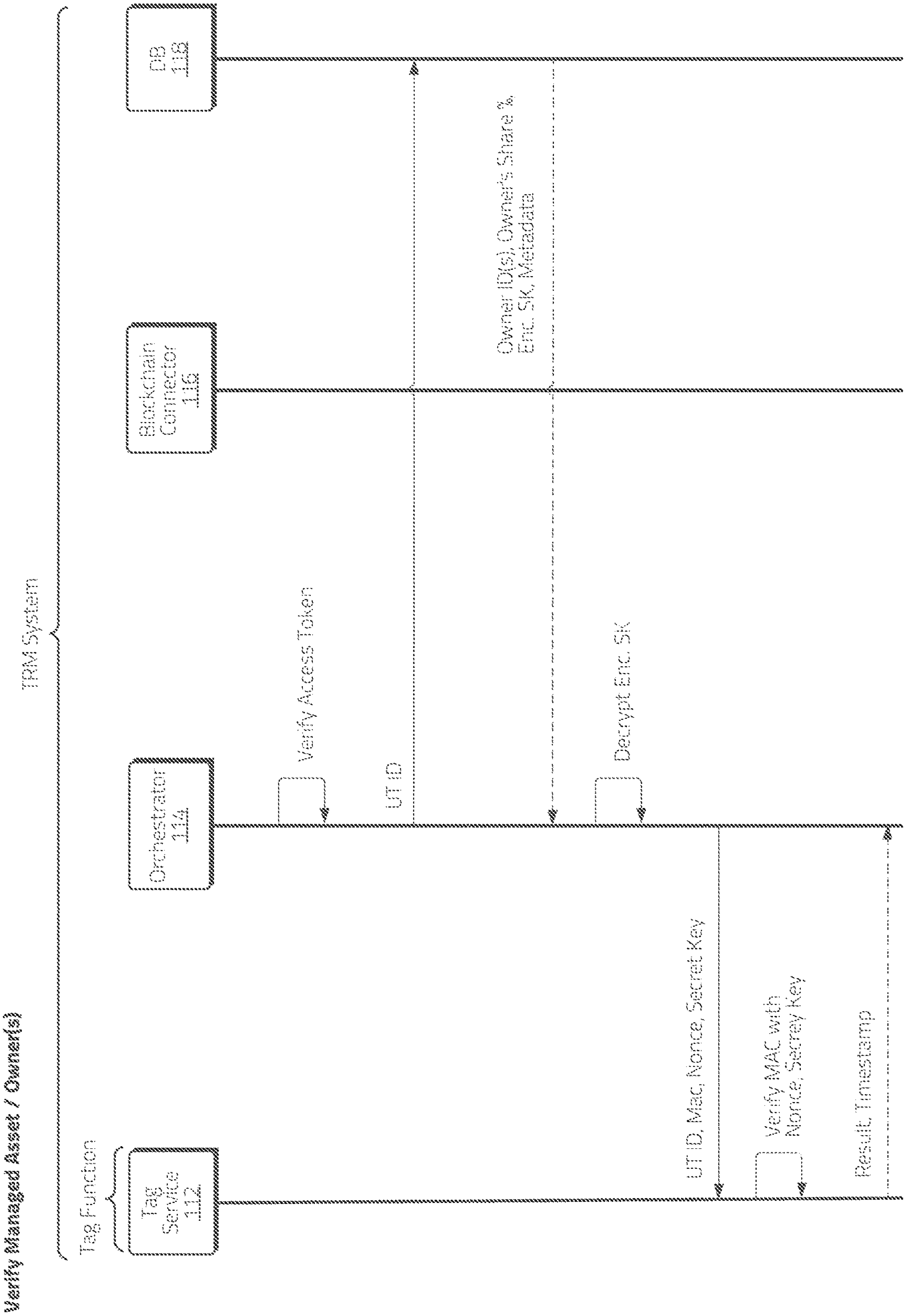
FIG. 2B illustrates a second part of a non-limiting example of a process for verifying a managed asset and/or its ownership consistent with certain embodiments disclosed herein.
Figure 2C:
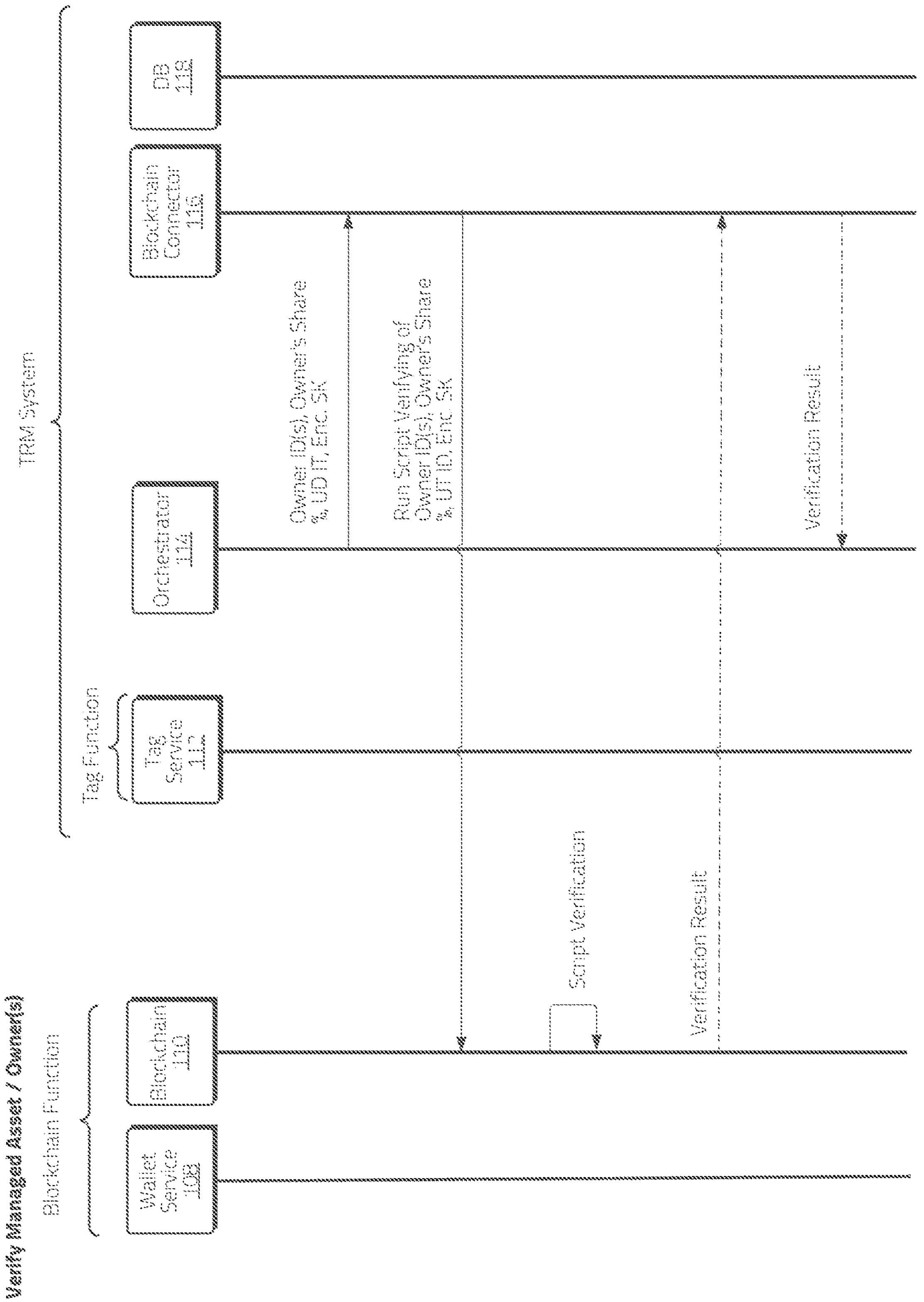
FIG. 2C illustrates a third part of a non-limiting example of a process for verifying a managed asset and/or its ownership consistent with certain embodiments disclosed herein.
Figure 2D:
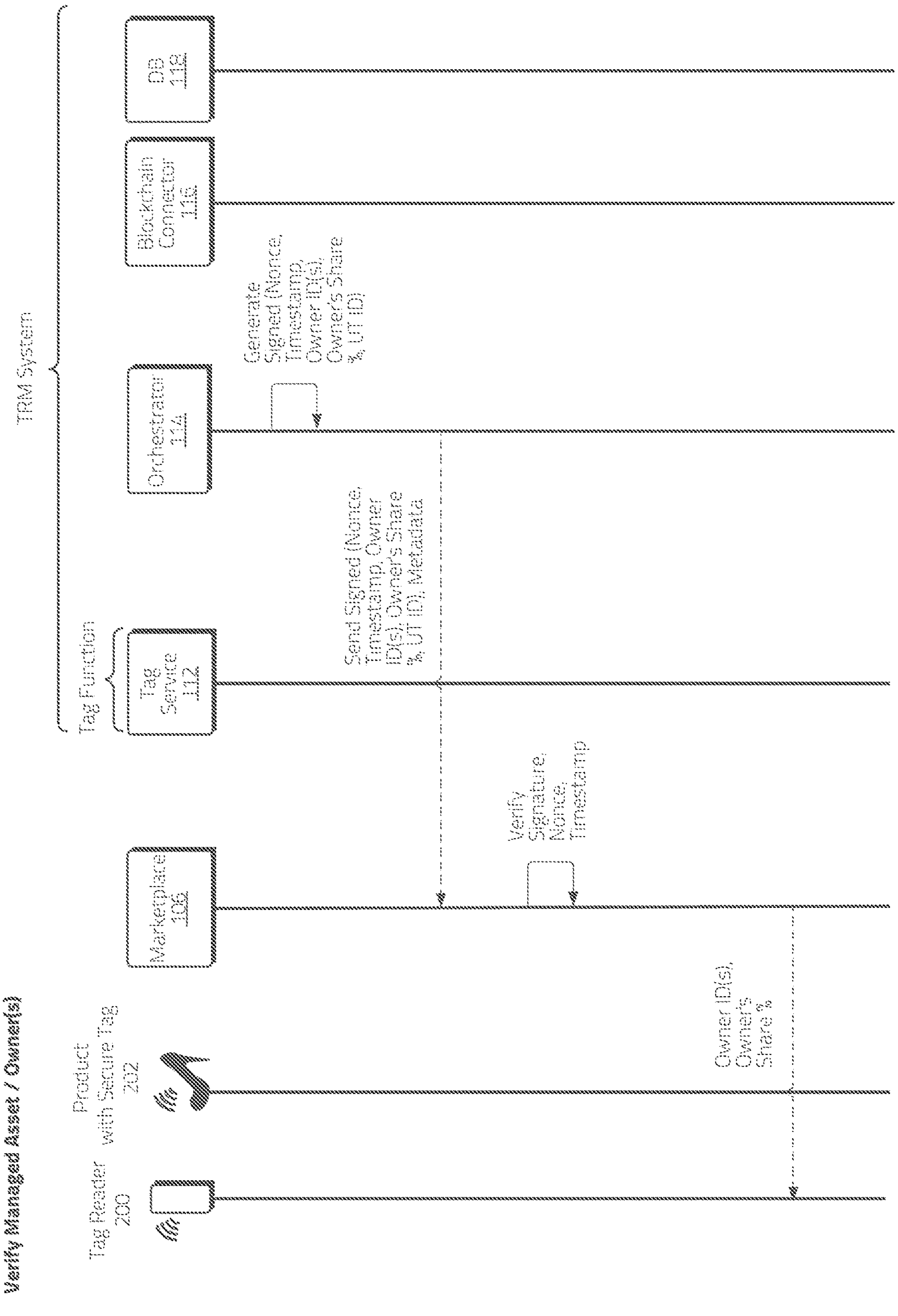
FIG. 2D illustrates a fourth part of a non-limiting example of a process for verifying a managed asset and/or its ownership consistent with certain embodiments disclosed herein.
Figure 2E:
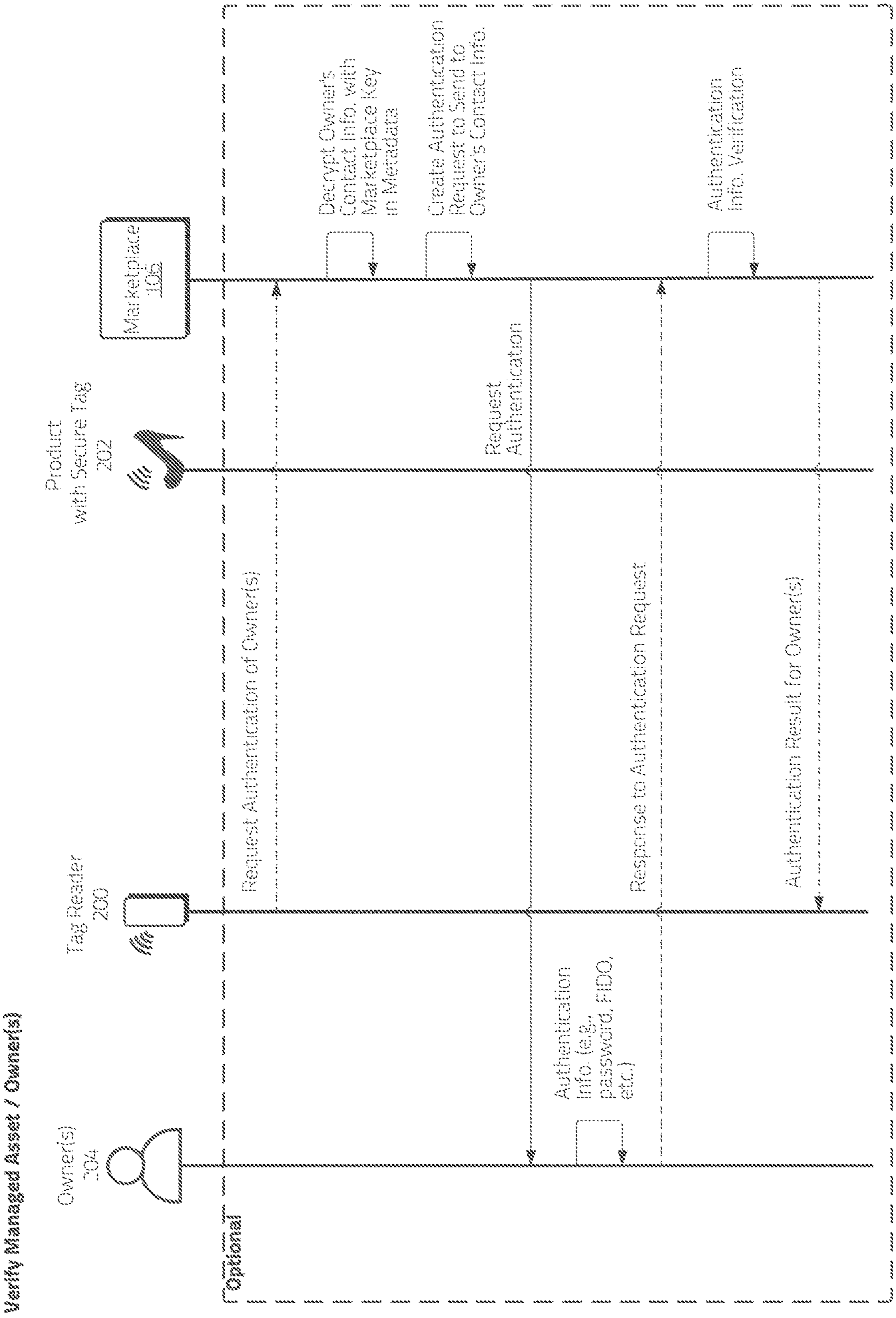
FIG. 2E illustrates a fifth part of a non-limiting example of a process for verifying a managed asset and/or its ownership consistent with certain embodiments disclosed herein.
Figure 3A:
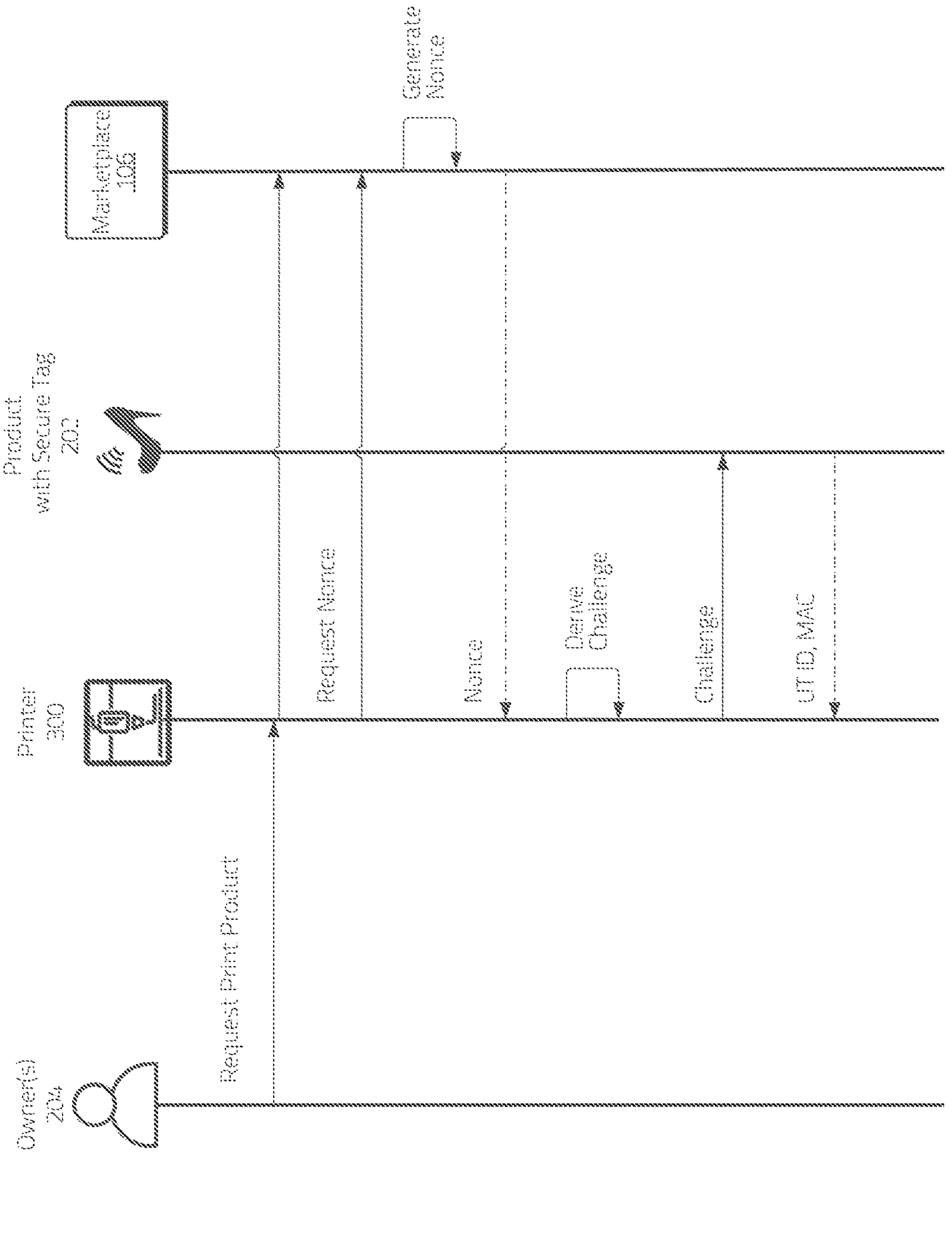
FIG. 3A illustrates a first part of a non-limiting example of a process of printing and/or otherwise producing a product associated with a managed asset consistent with certain embodiments disclosed herein.
Figure 3B:
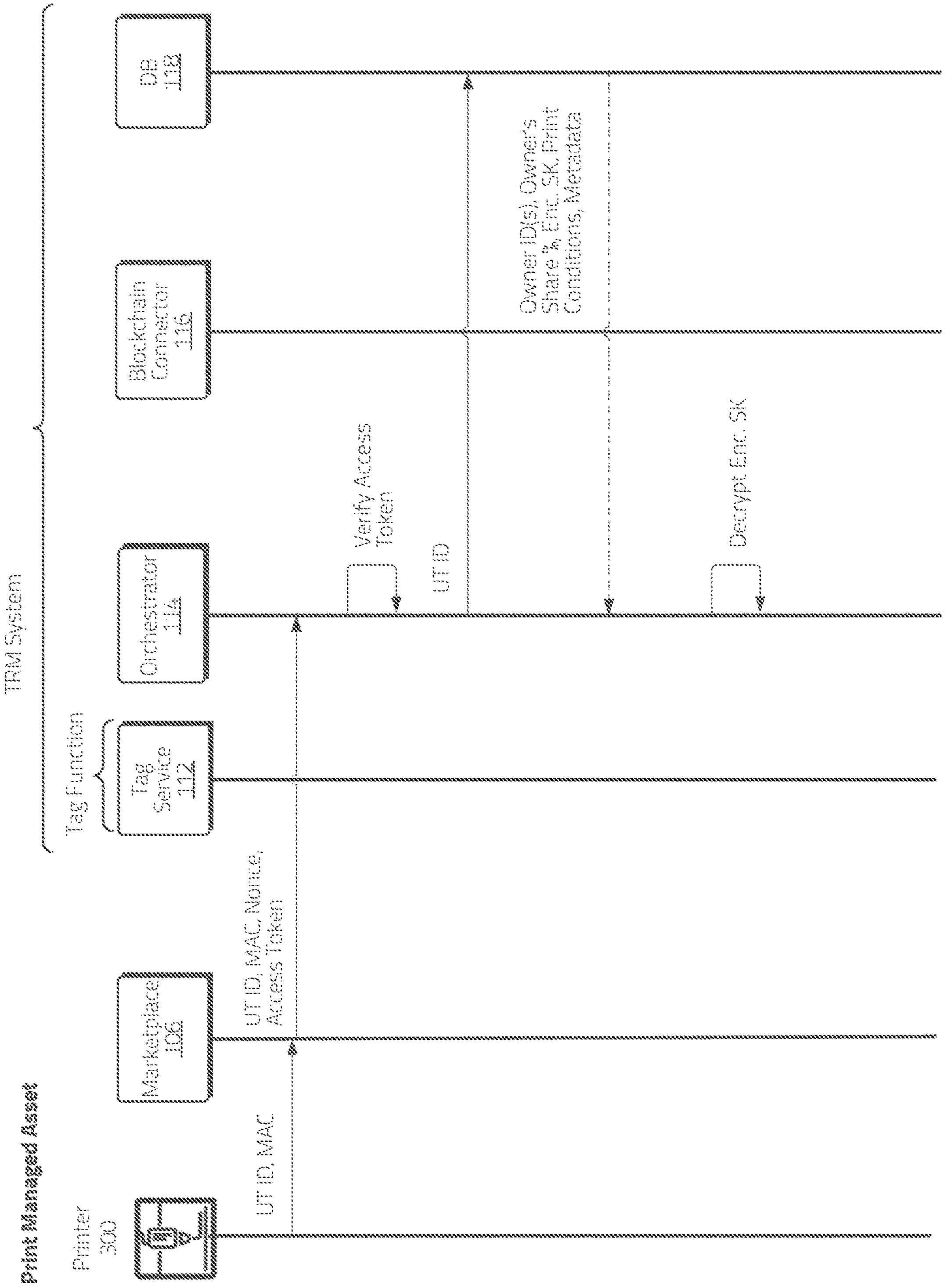
FIG. 3B illustrates a second part of a non-limiting example of a process of printing and/or otherwise producing a product associated with a managed asset consistent with certain embodiments disclosed herein.
Figure 3C:
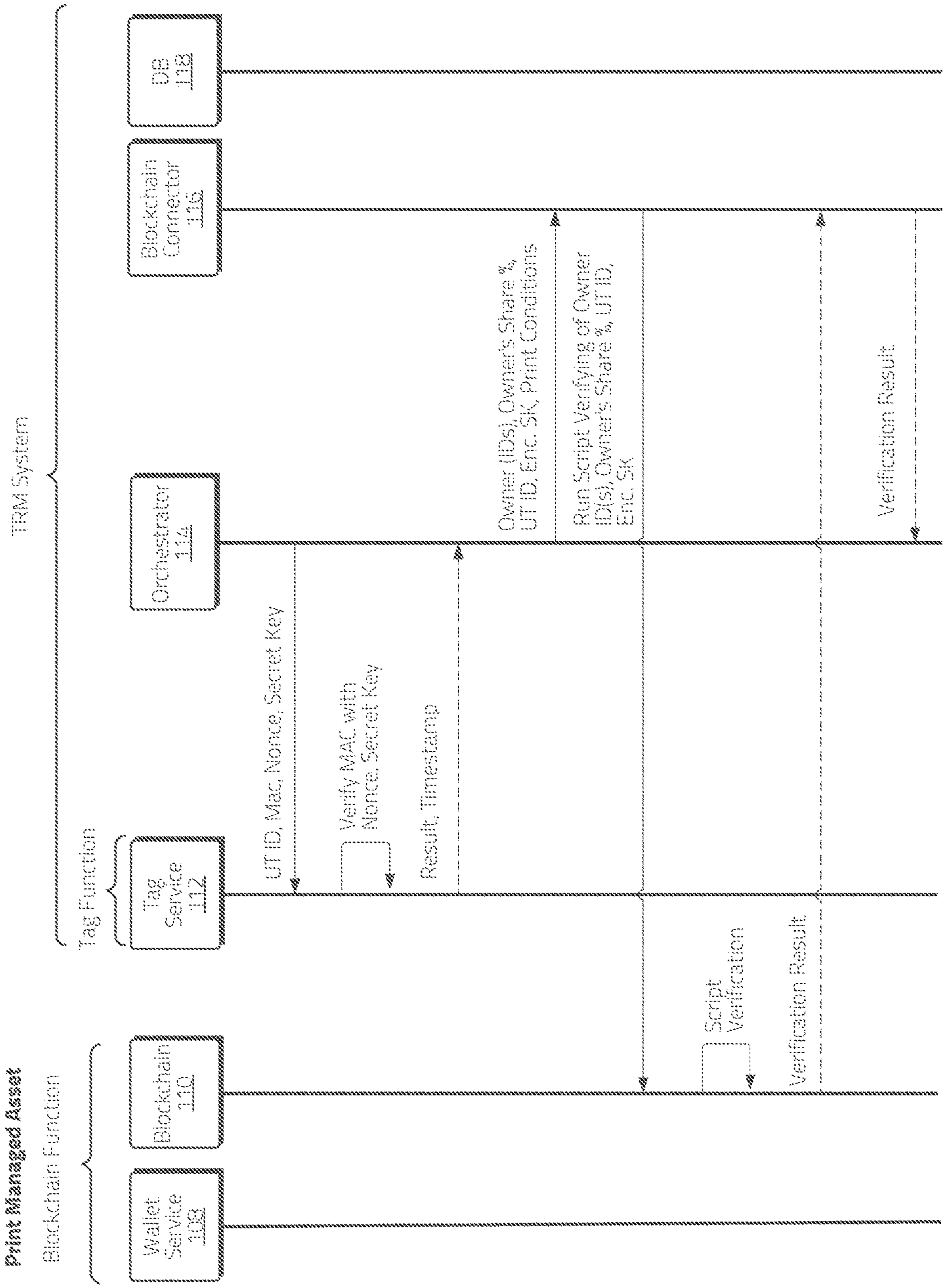
FIG. 3C illustrates a third part of a non-limiting example of a process of printing and/or otherwise producing a product associated with a managed asset consistent with certain embodiments disclosed herein.
Figure 3D:
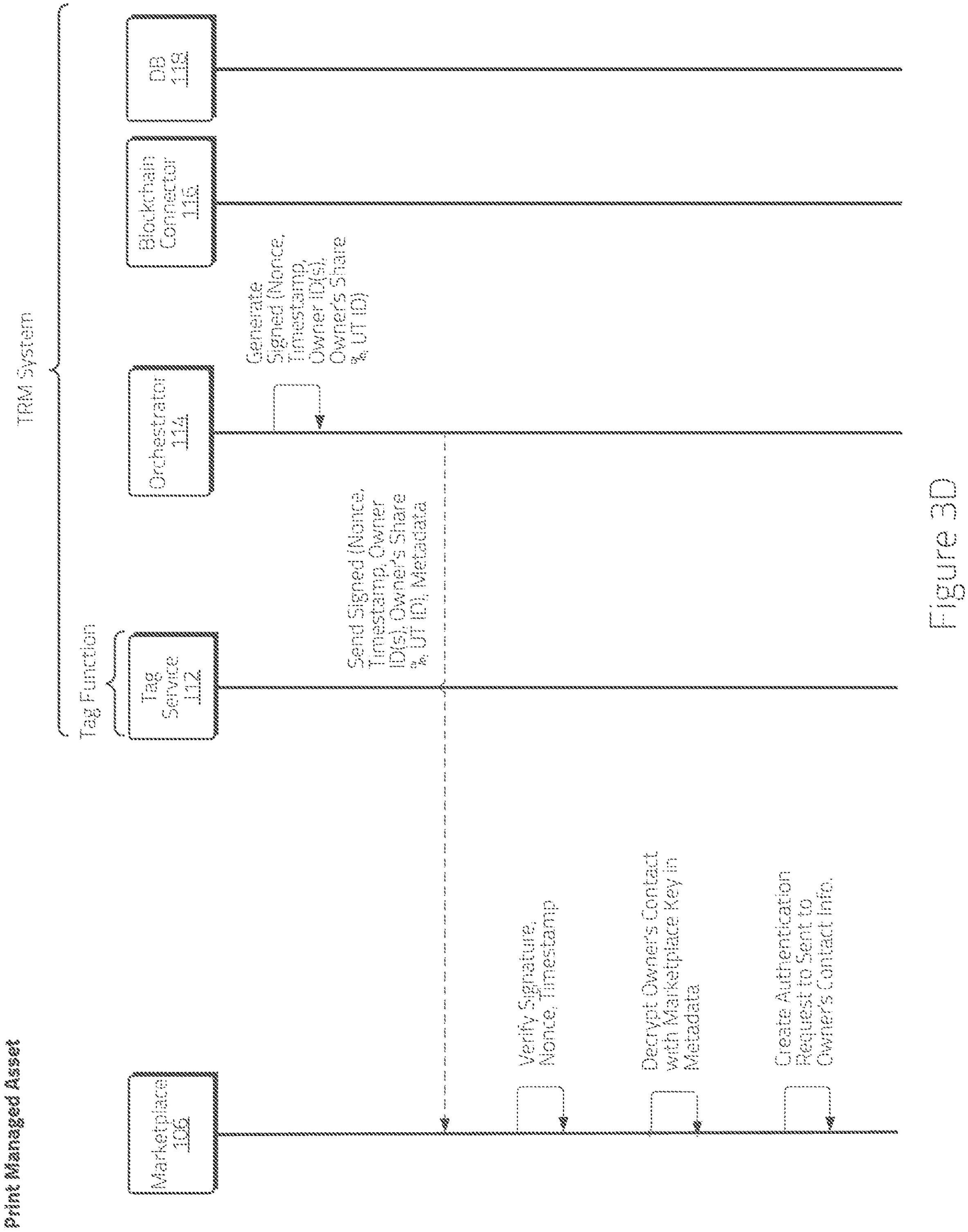
FIG. 3D illustrates a fourth part of a non-limiting example of a process of printing and/or otherwise producing a product associated with a managed asset consistent with certain embodiments disclosed herein.
Figure 3E:
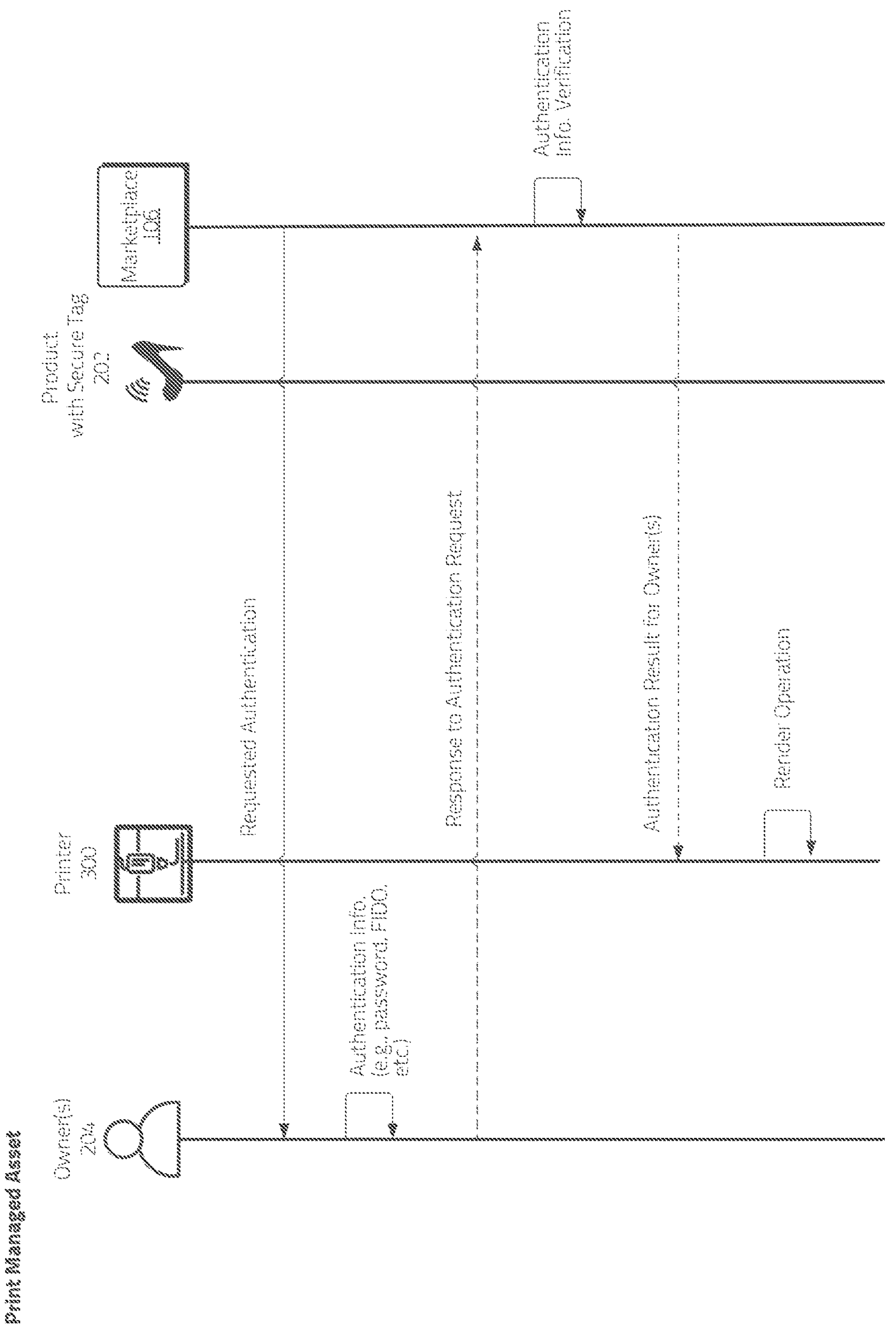
FIG. 3E illustrates a fifth part of a non-limiting example of a process of printing and/or otherwise producing a product associated with a managed asset consistent with certain embodiments disclosed herein.

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings where, in certain instances (but not necessarily all), like parts may be referred to by like numerical references. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method and/or process disclosed herein do not necessarily need to be executed in any specific order, or even sequentially, nor need the steps be executed only once, unless otherwise specified.

Embodiments of the disclosed systems and methods may provide for dynamic management of physical products and/or associated NFTs in a secure way. In various embodiments, token information may be recorded in a secure tag, which may comprise an NFC tag. Such NFC secure tags may be physically embedded, integrated, and/or otherwise affixed to a product. In further embodiments, a watermark, which may be physically embedded and/or otherwise printed, integrated, and/or otherwise affixed to a product, and/or may comprise a digital watermark associated with a digital asset, may be used to reference and/or otherwise identify a virtual digital tag managed by a service.

When associated with a secure tag and/or a watermark, a physical product may be referred to in various instances herein as a "managed asset." Rights of rightsholders of such managed assets (and by extension, associated physical products) may be definable in a manner such that they can be respected and/or otherwise enforced.

Various embodiments disclosed herein may use trusted ledgers to securely record certain assertions relating to the managed assets, rightsholders, and/or various ecosystem participants. Such assertions may be used in connection with rights binding, asset creation, asset and/or ownership verification, and/or printing and/or generation processes associated with managed assets.

Certain aspects of the disclosed processes may be performed by and/or otherwise in connection with one or more entities, services, and/or systems that may include, for example and without limitation, one or more of:

- Rightsholder—An entity holding rights in a product. In some instances, the rights holder may be an original rightsholder ("ORH") holding the original rights granted to and/or otherwise associated with a product. In certain embodiments, an ORH may be a creator of a product.
- Tag—A tag associated with a product. In some embodiments, a tag may comprise a physical secure tag associated with a physical product and in certain instances herein may be referred to generally as a secure tag. For example, the tag may comprise an NFC tag storing and/or otherwise encoding identification information associated with a product that, in some embodiments, may be unique identification information associated with the product. In certain embodiments, unique information associated with the product may comprise a public key associated with a private key generated by and/or otherwise derived from information unique to the product (e.g., a physical unclonable function ("PUF")) and/or from an injected key (e.g., a private key) and/or an injected key pair. A secure tag may be an "active" tag in that it may provide a response to a challenge issued to the tag, potentially generated based on information included in the challenge and/or uniquely and/or securely associated with the tag. In further embodiments, a tag may comprise a virtual digital tag, which may be referenced and/or otherwise identified using a watermark encoding identification information and/or other encoded information associated with the product. A virtual digital tag may comprise a software-based module managed by a service provider that may provide certain functional operability of a physical secure tag including, for example and without limitation, the ability to respond to challenges issued to the virtual digital tag based on information unique to the digital tag. The watermark may comprise a physical watermark (e.g., a watermark encoded using a texture and/or shape and/or the like), a printed watermark, and/or any other type of watermark. The watermark may directly encode information and/or may reference and/or otherwise link to associated information. In connection with digital products, the tag may comprise a digital tag, fingerprint, and/or watermark securely and/or indelibly associated with the digital product.

Tag Reader—A device and/or system that may be capable of reading information stored and/or otherwise encoded on a tag. In some embodiments, the tag reader may comprise an NFC tag reader. In further embodiments, the tag reader may comprise a camera and/or other scanning system configured to capture watermark information encoded in a product and to use such information to interact with a virtual digital tag managed by a service. In yet further embodiments, the tag reader may not necessarily be a stand-alone system and/or device, but instead may be integrated in another system, device, and/or service. In connection with certain digital tags (e.g., watermarks included in digital content and/or software), the tag reader may comprise a software service and/or function configured to access and/or otherwise read the digital tag information.

Product—An item to which rights may be attached. A product may comprise a physical product such as, for example and without limitation, a shoe, a handbag, and/or any other type of physical product. In further embodiments, a product may comprise a digital product such as, for example and without limitation, digital content, digital descriptions, instructions, and/or other information that may be used to generate and/or otherwise create a physical product (e.g., using 3D printing technology and/or the like), software, digital representations of physical content, and/or the like. It will be appreciated that embodiments of the disclosed systems and methods may be used in connection with managing a wide variety of products and/or associated rights, and that any specific examples of products described herein are used for purposes of illustration and explanation and are not to be viewed as limiting.

Marketplace service—An entity and/or service, which may comprise a third-party entity that uses offers a marketplace service allowing, for example and without limitation, creators and/or rightsholders to upload and/or offer products on the marketplace in connection with various transactions (e.g., sale, rental, transfer of rights, and/or the like), other entities to interact with the marketplace service to engage in such transactions, and/or the like.

Blockchain Service—A blockchain service and/or other suitable TIDAL and/or trusted ledger service. In some embodiments, the blockchain service may comprise a public blockchain service (e.g., the FLOW blockchain) managing a public blockchain. In further embodiments, the blockchain service may comprise a service managing a private blockchain. In some embodiments, the blockchain service may be offered by a token rights management ("TRM") system and/or service, as described in more detail below. Although various examples described herein may use a blockchain and/or a TIDAL, it will be appreciated that various embodiments and aspects of the disclosed systems and methods may be implemented using a variety of other trusted databases and/or ledgers that may, or may not, have certain attributes associated with a blockchain and/or a TIDAL.

Wallet Service—A digital wallet (e.g., a cryptographic currency wallet) that may be used in connection with various interactions and/or transactions involving the ecosystem detailed herein.

TRM System and/or Service—A TRM service may allow for a marketplace service and/or other entities to interact with various tag and/or token management services and engage in various transactions and/or interactions involving the ecosystem detailed herein.

Tag Service—A service that may be used in connection with various secure tag management, verification, and/or authentication activities. In some embodiments, the tag service may be offered by the TRM service. In further embodiments, the tag system may implement and/or otherwise manage virtual digital tags (although it will be appreciated that virtual digital tags may also be managed by a system and/or service separate from the tag service).

Orchestrator Service—A TRM service that may be used in connection with orchestrating and/or managing various services and/or operations performed by the TRM service and/or constituent services.

Blockchain Connector Service—The blockchain connector service may allow for the TRM service to interact with the blockchain service. In some embodiments, the blockchain connector service may be configured to structure various requests, queries, and actions directed to a blockchain service based on the particular configuration and/or requirements of the associated blockchain.

DB—A database that may be used to store and/or manage information used by the TRM service.

Event Indexer—a service that may allow for certain indexing and/or other management interactions with a blockchain service. In some embodiments, Graffle may be used an indexer service for interacting with a FLOW blockchain, although other services may also be used.

Printer—A system and/or device that may be used to print, generate, render, and/or otherwise create a product. In certain non-limiting examples, a printer system may comprise a 3D printing system.

Various embodiments of the disclosed systems and methods may provide mechanisms for the creation, sharing, agreement of terms and/or conditions relating to the printing and/or generation of associated product(s), listing of managed assets in an NFT marketplace, verification of products associated with managed assets and/or associated owner(s), and/or printing and/or generation of product(s) associated with managed assets.

Rightsholders may list managed assets that to the NFT marketplace for distribution. At that time, a rightsholder who is a seller may decide how to sell (e.g., number of sales, etc.) and/or price. For example, in some implementations, a rightsholder may determine a selling price, and/or auction conditions for managed assets to be exhibited on an NFT marketplace. Consumers may purchase rights (e.g., printing and/or generation rights, etc.) and/or sales rights of managed assets listed on the NFT marketplace according to a listing price and, in some cases, view through secondary distribution, trade rights, and/or distribution rights. Transactions in the primary and/or secondary distribution of the NFT marketplace may be recorded on the blockchain, which may allow rightsholders to manage their managed assets. Based on transactions in the primary and secondary digital asset distribution markets, rightsholders may receive (e.g., automatically receive) profit sharing based on the contract agreed on a creator platform.

In some embodiments, when rightsholders list their managed assets on the NFT marketplace, the NFT marketplace may also inherit the profit distribution agreed between the rightsholders, so that the profits generated in the primary and secondary distribution respect established rights. Profits may be divided among rightsholders. In addition, transactions on the NFT marketplace may be stored in a form that can be accessed and audited by rightsholders and managed transparently.

Managed Asset Creation

Various embodiments of the disclosed systems and methods may provide mechanisms for the creation of managed assets by securely associating physical products with NFTs and/or other managed unique identifiers. Consistent with certain embodiments disclosed herein, tags, which may comprise secure tags (e.g., NFC tags) and/or digital tags referenced and/or otherwise identified by watermarks may be employed to associate physical products with NFTs and/or managed unique identifiers. Although various embodiments and examples described herein may describe using NFC tags as secure tags for purposes of illustration, it will be appreciated that the disclosed systems and methods are not so limited. Indeed, embodiments of the disclosed systems and methods may be used in connection with a variety of other types of tags, which as noted above may comprise virtual digital tags referenced by information encoded by watermarks.

FIGS. 1A-1D illustrates a non-limiting example of a process for a creating a managed asset consistent with certain embodiments disclosed herein. As shown, a rightsholder 100, which may be an ORH, may provision a secret key to a secure tag 102. In some embodiments, the secure tag 102 may be a unique tag associated with a unique tag identifier ("UT ID"). In the illustrated example, the secure tag 102 may comprise an NFC tag, although it will be appreciated that other types of secure tags may also be used. It will be further appreciated that various aspects of the embodiments of the illustrated example may further be implemented using watermarks and/or virtual digital tags.

The rightsholder 100 may obtain the unique identifier associated with the tag 102 (e.g., from the tag 102 directly and/or via a service associated with the tag 102), and may embed, integrate, and/or otherwise include the secure tag 102 in a product 104. In various embodiments, the product 104 may comprise a physical product such as, for example and without limitation, a shoe, a handbag, a consumer electronic device, physical artistic works, sports memorabilia, physical items with historical significance, limited edition products, and/or the like. It will be appreciated that embodiments of the disclosed systems and methods may be used in connection with a wide variety of physical products, and that any specific examples of products described herein are used for purposes of illustration and explanation and are not to be viewed as limiting.

The rightsholder 100 may communicate to a marketplace service 106 an ID associated with a product owner and/or the rightsholder, a percentage of ownership and/or associated rights held by the rightsholder 100 (e.g., a share % if applicable), the unique tag identifier, and the secret key. In some embodiments, rules and/or conditions for rendering, printing, generating, creating, and/or duplicating an associated product may be shared with the marketplace service 106, which may be enforced as part of a DRM process, as discussed in more detail below.

In certain embodiments, contact information associated with the owner and/or rightsholder 100 may also be shared with the marketplace service 106. To protect any sensitive or personal information that may be included in the shared contact information, the marketplace service 106 may encrypt the contact information with a key associated with the marketplace service 106 and store it in metadata associated with the product 104.

The owner and/or rightsholder ID(s), percentage of ownership and/or rights, unique tag identifier, secret key, metadata associated with the product, an access token (e.g., an access token provisioned to the marketplace service by the TRM system) and/or any conditions associated with the product (e.g., printing conditions) may be shared by the marketplace service 106 with an orchestrator service 114 of the TRM service. The orchestrator service 114 may verify the access token. If the access token is verified, the orchestrator service 114 may encrypt the secret key (e.g., using a key associated with the TRM service).

An asset fact may be generated by the orchestrator service 114 that includes, for example and without limitation, one or more of an owner and/or rightsholder identifier(s), a percentage of associated ownership and/or rights, the unique tag identifier, the encrypted secret key, and/or any conditions associated with the product 104. The orchestrator service 114 may further store the owner and/or rightsholder identifier(s), percentage of associated ownership and/or rights, the unique tag identifier, encrypted secret key, and/or any conditions associated with the product 104, and/or metadata associated with the product 104 in a DB 118 of the TRM service.

The orchestrator service 114 may share various information with a blockchain connector service 116 of the TRM service configured to interface with a blockchain service 110. For example, the asset fact and/or other associated details may be shared with the blockchain connector service 116 for recordation in a blockchain 110. Although various embodiments and examples described herein describe using a blockchain purposes of illustration and explanation, it will be appreciated that the disclosed systems and methods are not so limited. Indeed, embodiments of the disclosed systems and methods may be used in connection with a variety of other types of trusted ledgers, TIDALs, and/or the like.

The blockchain connector service 116 may facilitate integration of various systems and/or services using established commercial blockchain and/or digital wallet services. In various embodiments, the blockchain connector service 116 may provide known APIs and/or other interfaces to allow for relatively seamless interaction between various systems and/or services using other blockchain and/or digital wallet services, allowing for more flexible integration of various embodiments with other blockchain and wallet services. For example and without limitation, in various embodiments, the blockchain connector service 116 may integrate various aspects of the disclosed systems and methods with the FLOW blockchain, although other suitable blockchain services (e.g., Polygon) may also be used in connection with certain disclosed embodiments. Moreover, it will be appreciated that in certain embodiments and examples described herein, various systems and/or services may interact directly with blockchain and/or wallet services without the use of a blockchain connector service 116, potentially interacting with blockchain and/or wallet services (which may be either integrated and/or third-party services) directly (e.g., via native API calls) and/or via other intermediate services.

The blockchain connector service 116 may retrieve blockchain access credentials and, using the retrieved credentials, generate a signed transaction that includes the asset fact for recordation in the blockchain 110. For example, the blockchain connector service 116 may generate the transaction including the asset fact and sign it as a proposer and payer (e.g., with the payer being the TRM service, the marketplace service, and/or the rightsholder 100). The blockchain connector service 116 may share the signed transaction with the blockchain 110.

Upon receipt of the signed transaction, the blockchain service 110 may mint an asset token (e.g., an NFT) and record in the blockchain. The minted asset token may comprise information relating to, for example and without limitation, the owner and/or rightsholder identifiers, percentage(s) of associated ownership and/or rights, unique tag identifiers, the encrypted secret key, and/or any conditions associated with the product (e.g., print conditions).

In certain embodiments, the event indexer service 120 may receive an update from the blockchain service 110. In some embodiments, Graffle may be used an event indexer service 120 for interacting with a FLOW blockchain, although other services may also be used. The update may be shared by the event indexer service 120 with the orchestrator service 114 of the TRM service. In some embodiments, the orchestrator service 114 may manage an asset table included in the DB 118 of the TRM service. Based on the update shared by the event indexer service 120, a new entry may be created in the asset table. In addition, the status of recording the transaction associated with the asset creation may be updated in a task table included in the DB 118 which may manage the status of various transactions and/or operations performed by the TRM service and/or its constituent services (e.g., the orchestrator service 114). In various embodiments, the DB 118 of the TRM service may be queried by the marketplace service 106 to determine any updates. In certain embodiments, this querying of the DB 118 by the marketplace service 106 may be periodic and/or event driven.

Managed Asset and Owner(s) Verification

Various embodiments of the disclosed systems and methods may provide mechanisms for the verification of the authenticity and/or the ownership of managed assets and, by extension, associated products. Consistent with various disclosed embodiments, tag readers may be employed to read information stored and/or otherwise encoded on a secure tag used in connection with asset and/or ownership verification processes.

FIGS. 2A-2E illustrate conceptual diagrams showing non-limiting examples of various aspects of an asset and/or ownership verification process consistent with certain embodiments disclosed herein. As shown, a secure tag reader 200 may be used in connection with verifying and/or authenticating a managed asset and/or an associated product 202 and/or ownership of the managed asset. In some embodiments, the tag reader 200 may comprise an NFC tag reader.

The tag reader 200 may request a nonce from the marketplace service 106. In response to the request, the marketplace service 106 may generate the nonce and return it to the tag reader 200. Based on the received nonce, the tag reader 200 may generate and/or otherwise derive a challenge. The challenge may be issued by the tag reader 200 to the secure tag embedded, included, and/or otherwise associated with the product 202.

In response, the secure tag associated with the product 202 may return to the tag reader 200 the unique tag identifier and the result of a calculation based on the issued challenge and secure information stored by the secure tag. For example and without limitation, in some embodiments, a message authentication code ("MAC") may be calculated by the secure tag based on the issued challenge and secret key provisioned to the secure tag.

The tag reader 200 may communicate the returned tag identifier and MAC (and/or other generated value), the nonce generated by the marketplace service 106 and shared with the tag reader 200, and an access token (e.g., an access token provisioned to the marketplace service 106 by the TRM service) to the orchestrator service 114 of the TRM service. Although in various embodiments and examples herein described a MAC-based challenge in connection with tag verification, it will be appreciated that other techniques for tag verification may also be used. For example and without limitation, the secure tag may return to the tag reader 200 a message that is encrypted and/or signed using a key (e.g., a private key) stored by and/or otherwise associated with the secure tag. This signed and/or encrypted message may be used in connection with verifying the secure tag with the tag service 112 of the TRM system.

The orchestrator service 114 may verify the access token. If the access token is verified, the orchestrator service 114 may query the DB 118 with the tag identifier and, in response, receive the identifiers(s) associated with product owner(s) and/or rightsholder(s), a percentage of ownership and/or associated rights held by the owner(s) and/or rightsholder(s) (e.g., a share % if applicable), the encrypted secret key, and/or metadata stored by the DB 118 associated with the subject tag identifier. Using a decryption key, the orchestrator service 114 may decrypt the secret key returned from the DB 118 and provide the decrypted secret key to the tag service 112 along with the tag identifier, the MAC, and the nonce.

The tag service 112 may verify the MAC using the provided nonce and the decrypted secret key, returning a result to the orchestrator service 114 along with an associated timestamp. If verified by the tag service 112, the orchestrator service 114 may query the blockchain connector service 116 with the tag identifier, the identifier(s) associated with product owner(s) and/or rightsholder(s), the percentage of ownership and/or associated rights held by the owner(s) and/or rightsholder(s), and the encrypted secret key.

The blockchain connector service 116 may run a script to verify whether the blockchain managed by the blockchain service 110 includes an entry corresponding to the tag identifier, the identifiers(s) associated with product owner(s)

and/or rightsholder(s), the percentage of ownership and/or associated rights held by the owner(s) and/or rightsholder(s), and the encrypted secret key. The blockchain service 110 may verify whether the entry is included in the blockchain by running the script, returning the result to the blockchain connector service 116 which may be shared with the orchestrator service 114.

The orchestrator service 114 may generate a signature based on one or more of the nonce, the timestamp returned from the tag service 112 (e.g., which may be used to check and/or otherwise verify freshness of the tag information managed by the tag service 112), the identifier(s) associated with product owner(s) and/or rightsholder(s), the percentage of ownership and/or associated rights held by the owner(s) and/or rightsholder(s), and/or the tag identifier. The signature may be shared with the marketplace service 106 along with associated metadata.

The marketplace service 106 may verify one or more of the received signature, nonce, and/or timestamp. Based on the verification, the marketplace service 106 may provide the tag reader 200 with an indication of the verified identifiers(s) associated with product owner(s) and/or rightsholder(s) and/or the percentage of ownership and/or associated rights held by the owner(s) and/or rightsholder(s).

As discussed above, in some implementations, an owner and/or rightsholder 204 (which may be an ORH) may share contact information with a marketplace service 106, which in some embodiments may be recorded in metadata. The tag reader 200 and/or a user thereof may wish to authenticate the owner and/or rightsholder, issuing a corresponding request to the marketplace service 106. The marketplace service 106 may decrypt encrypted contact information (if any) associated with the owner and/or rightsholder stored by the marketplace service 106 using an associated marketplace decryption key. The marketplace service 106 may then generate an authentication request and send the request to the rightsholder and/or owner 106 based on the decrypted contact information.

Upon receipt of the authentication request, the owner and/or rightsholder 204 may authenticate their identity (e.g., using ID/password authentication, multi-factor authentication ("MFA"), FIDO, etc.), providing an authentication response to the marketplace service 106. The marketplace service 106 may verify the information provided in the authentication response and, if valid, return an authentication result to the tag reader 200.

Managed Asset Printing and/or Generation

In various embodiments, a tagged product may comprise and/or otherwise be associated with digital information that may be provided to a device that may be used to render and/or otherwise generate a corresponding physical item. For example and without limitation, the tagged product may comprise input digital data that may be provided to a 3D printing system to generate an item. The secure tag may comprise digital fingerprint and/or watermark data securely associated with digital data representing the product that may be used to generate the physical product. In further embodiments, data and/or instructions used to generate a physical product may be obtained via other methods including, for example and without limitation, by scanning a physical product, by accessing the data and/or instructions for generating the product (potentially based on information obtained from the physical product and/or the secure tag such as a link and/or an identifier), and/or the like.

FIGS. 3A-3E illustrate a non-limiting example of a process of printing and/or otherwise producing a product associated with a managed asset consistent with certain embodiments disclosed herein. An owner and/or rightsholder 204 may issue a request to print a physical product to a printing system 300. Although various embodiments and examples disclosed herein describe using a 3D printing system for purposes of illustration and explanation, it will be appreciated that in various implementations, the printing system 300 may represent any suitable system and/or device used to generate a physical product associated with a managed asset consistent with certain embodiments disclosed herein.

Data for generating the physical product (e.g., digital data and/or instructions that may be used to render the physical product by the printing system 300) may be provided to the printing system 300. In some embodiments, the printing system 300 may further communicate this information to the marketplace service 106.

The printing system 300 may request a nonce from the marketplace service 106. In response to the request, the marketplace service 106 may generate the nonce and return it to the printing system 300. Based on the received nonce, the printing system 300 may generate and/or otherwise derive a challenge. The challenge may be issued by the printing system 300 to the tag embedded in the physical product 202 (e.g., an NFC tag embedded in a product being reproduced).

In response, the secure tag may return to the printer system 300 the tag identifier and a MAC calculated based on the issued challenge and a secret key provisioned to the secure tag (or another result generated based on the issued challenge and secret information). The printing system 300 may communicate the tag identifier and the MAC to the marketplace service 106. The marketplace service 106 may in turn communicate the tag identifier, the MAC, the nonce generated by the marketplace service 106 and shared with the printing system 300, and an access token (e.g., an access token provisioned to the marketplace service by the TRM service) to the orchestrator service 114 of the TRM system.

The orchestrator service 114 may verify the access token. If the access token is verified, the orchestrator service 114 may query the DB 118 with the tag identifier and, in response, receive the ID(s) associated with product owner(s) and/or rightsholder(s), a percentage of ownership and/or associated rights held by the owner(s) and/or rightsholder(s) (e.g., a share % if applicable), an encrypted secret key, and/or metadata stored by the DB 118 associated with the subject tag identifier. In some embodiments, the DB 118 may further return print conditions associated with the product to the orchestrator service 114.

A variety of print conditions may be used in connection with embodiments disclosed herein. In some embodiments, print conditions may comprise data used by the printing system 300 to print a physical item based on the corresponding digital input data represented by the product 202. In certain embodiments, if the input data is encrypted, the print conditions may comprise a key that may be used to decrypt the data. Print conditions may further comprise an indication of a number of physical items that may be printed corresponding to the managed product. In further embodiments, print conditions may comprise one or more parameters (e.g., user configurable parameters) that may comprise, for example and without limitation, one or more of a color a physical item corresponding to the digital product, the size of a physical item corresponding to the digital product, materials, and/or the like.

Using a decryption key, the orchestrator service 114 may decrypt the secret key returned from the DB 118 and provide the decrypted secret key to the tag service 112 along with the tag identifier, the MAC, and the nonce.

The tag service 112 may verify the MAC using the provided nonce and the decrypted secret key, returning a result to the orchestrator service 114 along with an associated timestamp. If verified by the tag service 112, the orchestrator service 114 may query the blockchain connector service 116 with the tag identifier, the identifier(s) associated with product owner(s) and/or rightsholder(s), the percentage of ownership and/or associated rights held by the owner(s) and/or rightsholder(s), the encrypted secret key, and/or any applicable print conditions.

The blockchain connector service 116 may run a script to verify whether the blockchain managed by the blockchain service 110 includes an entry corresponding to the tag identifier, the identifier (s) associated with product owner(s) and/or rightsholder(s), the percentage of ownership and/or associated rights held by the owner(s) and/or rightsholder(s), the encrypted secret key, and/or the print conditions. The blockchain service 110 may verify whether the entry is included in the blockchain, returning the result to the blockchain connector service 116 which may be shared with the orchestrator service 114.

The orchestrator service 114 may generate a signature based on one or more of the nonce, the timestamp returned from the tag service (e.g., which may be used to check and/or otherwise verify freshness of the tag information managed by the tag service), the identifiers(s) associated with product owner(s) and/or rightsholder(s), the percentage of ownership and/or associated rights held by the owner(s) and/or rightsholder(s), tag identifier, and/or applicable print conditions. The signature may be shared with the marketplace service 106 along with associated metadata.

The marketplace service 106 may verify one or more of the received signature, nonce, and/or timestamp. The marketplace service 106 may further decrypt any encrypted contact information associated with the owner and/or rightsholder stored by the marketplace service 106 using an associated marketplace decryption key. The marketplace service 106 may then generate an authentication request and send the request to the rightsholder and/or owner based on the decrypted contact information. Upon receipt of the authentication request, the owner and/or rightsholder 204 may authenticate their identity (e.g., using ID/password authentication, MFA, FIDO, etc.), providing an authentication response to the marketplace service 106. The marketplace service 106 may verify the information provided in the authentication response and, if valid, return an any applicable print conditions and/or instructions to the printing system 300. The printing system 300 may then render the physical item corresponding to the product in accordance with the given print conditions and/or instructions.

Figure 4:
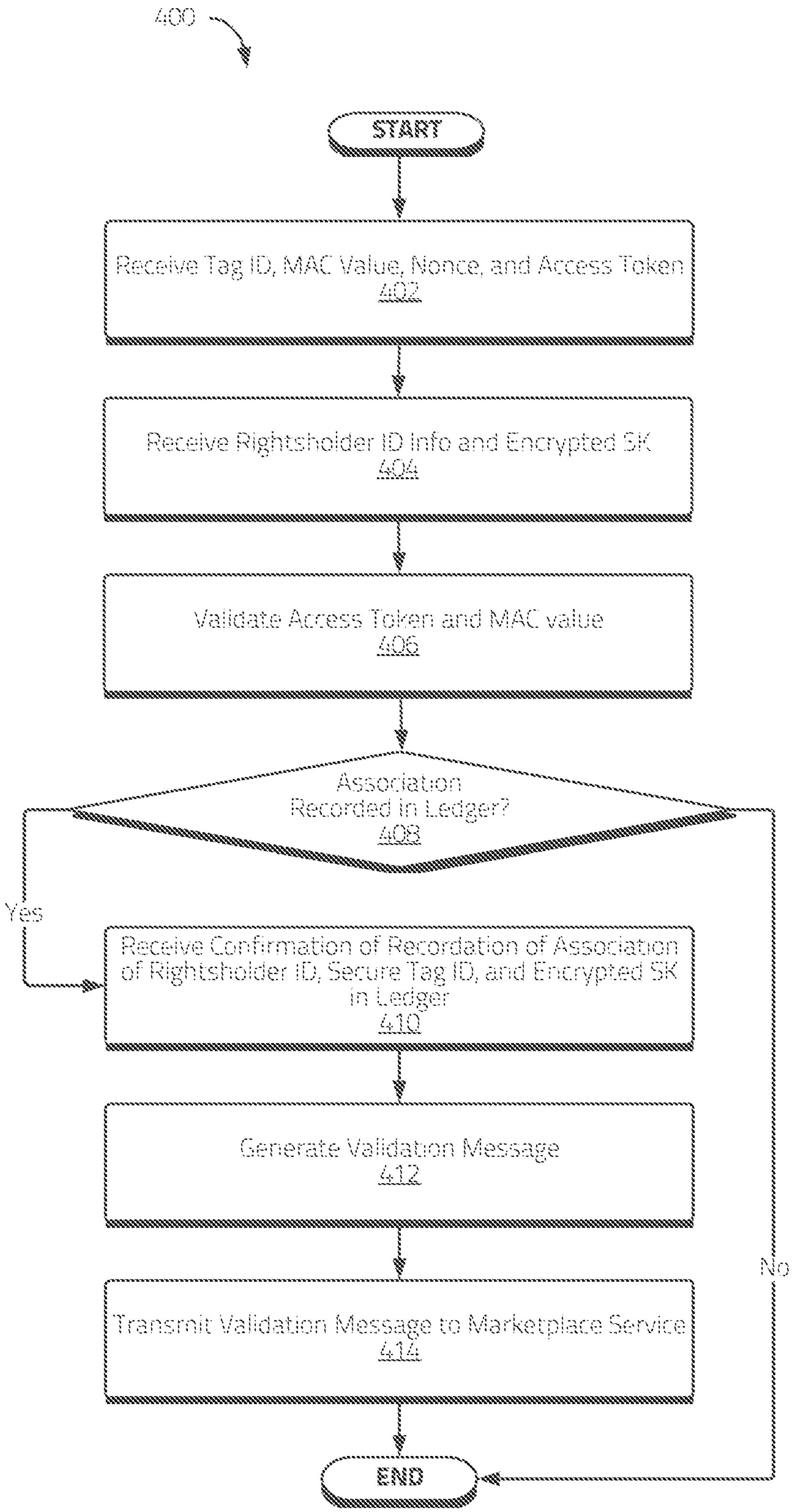
FIG. 4 illustrates a flow chart of a non-limiting example of a method for managing an asset associated with a physical product consistent with certain embodiments disclosed herein.

FIG. 4 illustrates a flow chart of a non-limiting example of a method for managing an asset associated with a physical product consistent with certain embodiments of the present disclosure. The illustrated method 400 may be implemented in a variety of ways, including using software, firmware, hardware, and/or any combination thereof. In certain embodiments, various aspects of the method 400 and/or its constituent steps may be performed by a service, system, and/or device configured to implement embodiments of a TRM service (and/or associated services such as, for example and without limitation, a orchestrator service, a tag service, a blockchain connector service, a database service), and/or any other suitable application, device, system and/or service or combination of applications, devices, systems, and/or services.

At 402, a TRM service (and/or an associated orchestrator service) may receive from a marketplace service, a secure tag identifier associated with a physical product (e.g., a handbag, a shoe and/or other footwear, electronic systems, etc.), a first value generated by a secure tag associated with the physical product (e.g., a MAC value), a nonce value, and an access token. In some embodiments, the secure tag identifier may be associated (e.g., uniquely associated) with a secure tag included in the product. Consistent with certain embodiments disclosed herein, the secure tag may comprise an NFC tag, although other types of secure tags may also be employed. The secure tag identifier may be obtained by the marketplace service from a suitable tag reader system.

The TRM service may further receive rightsholder identification information and an encrypted secure key associated with the secure tag identifier at 404. In certain embodiments, the rightsholder identification and the encrypted secure key may be retrieved from a secure database, which depending on the implementation may execute on the same system or a different system than the TRM service.

In further embodiments, the TRM service may further receive metadata associated with the secure tag identifier from the database. The metadata may comprise, for example and without limitation, information relating to the physical product and/or contact information associated with the rightsholder identification information.

The TRM service may validate the access token and the first value at 406. In certain embodiments, the TRM service may decrypt the encrypted secure key. The resulting secure key may be used in connection with validating the first value. For example, in some embodiments, validating the first value may comprise querying a tag service of the TRM service with the secure tag identifier, the first value, the nonce value, and the secure key, and receiving a validation response from the tag service. In certain embodiments, the tag service may be a service of the TRM service, and the validation response received from the tag service may comprise a timestamp associated with the validation.

At 408, following successful validation of the access token, the TRM service may query a trusted ledger service to determine whether the rightsholder identification information, the secure tag identifier, and the encrypted secure key are associated with each other in an entry in a trusted ledger maintained by the ledger service. In certain embodiments, a blockchain connector service of the TRM service may be used to query the trusted ledger service. In various disclosed embodiments, the trusted ledger service may execute on a separate system and/or be associated with a separate service than the TRM service. The trusted ledger may comprise, for example and without limitation, a blockchain (e.g., a FLOW blockchain), a TIDAL, and/or the like.

The TRM service (and/or an associated connector service) may receive an indication at 410 from the trusted ledger service indicating that the rightsholder identification information, the secure tag identifier, and the encrypted secure key are associated with each other in an entry in a trusted ledger.

At 412, in response to receiving the indication from the trusted ledger service, the TRM service may generate a validation message. The validation message may comprise, for example and without limitation, one or more of a signed value generated based on the nonce value, a timestamp generated by the TRM service, the rightsholder identification information, the secure tag identifier, and/or the metadata. The validation message may be transmitted by the TRM service to the marketplace service at 414 validating the physical product.

Watermarks and/or Virtual Digital Tags

In various embodiments, a watermark, which may be physically embedded and/or otherwise printed, integrated, and/or otherwise affixed to a product, may be used to implement various aspects of the disclosed systems and methods. In some embodiments, a watermark may comprise a digital watermark, as may be the case with a software and/or other digital managed asset. Consistent with embodiments disclosed herein, a watermark may encode information (e.g., identification information) that allows for a reader system to interact with a virtual digital tag managed by a service to provide tag functionality consistent with various disclosed embodiments.

In some embodiments, a watermark may encode information identifying and/or otherwise referencing a digital tag managed by a service, which may be a tag service consistent with aspects of the disclosed embodiments and/or another system and/or service providing virtual digital tag functionality. The digital tag may virtualize certain operations and/or interactions of a physical secure tag such as, for example, an NFC tag. In this manner, based on information encoded by the watermark, a tag reader system, printer system, and/or other system and/or services may interact with a virtual digital tag in a similar manner as a physical secure tag. For example, a virtual digital tag may generate responses to challenges issued to the digital tag based on information included in a challenge and/or uniquely and/or securely associated with the digital tag.

In certain embodiments, secure communication channels may be established between a system and/or service interacting with a virtual digital tag and/or an associated service. In further embodiments, a system and/or service and/or a user thereof interacting with a virtual digital tag may authenticate with a service managing the virtual digital tag.

Example System and/or Service Architecture

Figure 5:
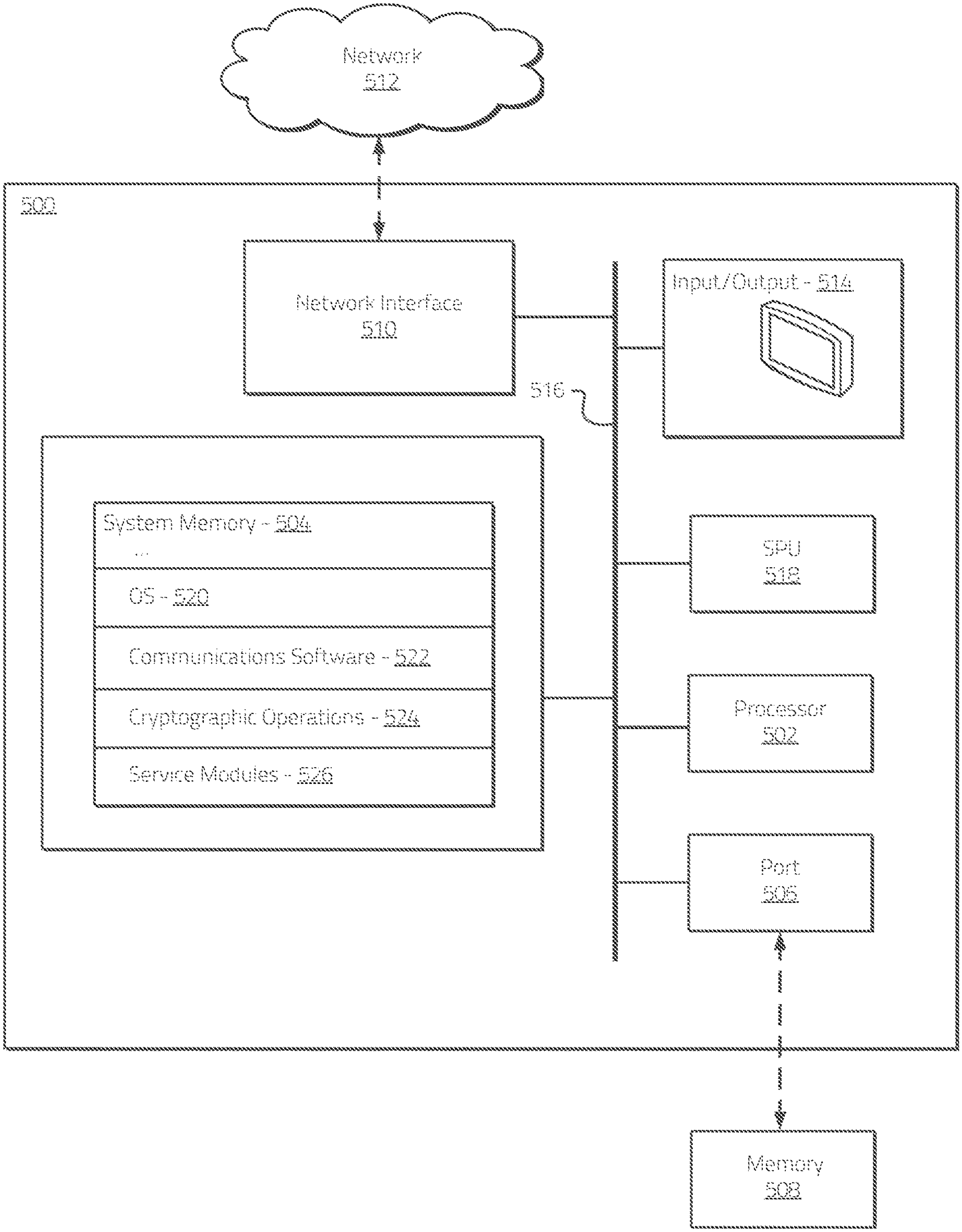
FIG. 5 illustrates an example of a system that may be used to implement certain embodiments of the systems and methods of the present disclosure.

FIG. 5 illustrates a non-limiting example of a system 500 that may be used to implement certain embodiments of the systems and methods of the present disclosure. The system 500 of FIG. 5 and/or aspects thereof may be included in a system, service, and/or device associated with an owner and/or rightsholder (e.g., an ORH), a marketplace service, a printing system, a tag reader system, a TRM service, a blockchain and/or TIDAL, a DB, a file storage service, a blockchain integration service, a wallet service, a blockchain service, cloud storage services, an orchestrator service, a blockchain connector service, an event indexer service, and/or any other service, which may comprise a trusted service, system, and/or component configured to implement embodiments of the disclosed systems and methods and/or aspects thereof.

The various systems and/or devices used in connection with aspects the disclosed embodiments may be communicatively coupled using a variety of networks and/or network connections (e.g., network 512). In certain embodiments, the network 512 may comprise a variety of network communication devices and/or channels and may utilize any suitable communications protocols and/or standards facilitating communication between the systems and/or devices. The network 512 may comprise the Internet, a local area network, a virtual private network, and/or any other communication network utilizing one or more electronic communication technologies and/or standards (e.g., Ethernet or the like). In some embodiments, the network 512 may comprise a wireless carrier system such as a personal communications system ("PCS"), and/or any other suitable communication system incorporating any suitable communication standards and/or protocols. In further embodiments, the network 512 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards, 4G and/or 5G communication standards (e.g., Long-Term Evolution ("LTE"), 5G New Radio ("NR"), orthogonal frequency division multiple access ("OFDMA"), etc.). In certain embodiments, the network 512 may incorporate one or more satellite communication links. In yet further embodiments, the network 512 may utilize IEEE's 802.11 standards, Bluetooth*, ultra-wide band ("UWB"), Zigbee*, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") 518 configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

In some embodiments, the system 500 may, alternatively or in addition, include a trusted execution environment and/or an SPU 518 that is protected from tampering by a user of the system or other entities by utilizing secure physical and/or virtual security techniques. A trusted execution environment and/or a SPU 518 can help enhance the security of sensitive operations such as personal information management, trusted credential, token, and/or key management, privacy and policy management, and other aspects of the systems and methods disclosed herein. In certain embodiments, the trusted execution environment and/or SPU 518 may operate in a logically secure processing domain and be configured to protect and operate on secret information, as described herein. In some embodiments, the trusted execution environment and/or a SPU 518 may include internal memory storing executable instructions or programs configured to enable the SPU 518 to perform secure operations, as described herein.

The operation of the system 500 may be generally controlled by the processing unit 502 and/or an SPU 518 operating by executing software instructions and programs stored in the system memory 504 (and/or other computer-readable media, such as memory 508, which may be removable). The system memory 504 may store a variety of executable programs or modules for controlling the operation of the system. For example, the system memory may include an operating system ("OS") 520 that may manage and coordinate, at least in part, and/or system hardware resources and provide for common services for execution of various applications.

The system memory 504 may further include, without limitation, communication software 522 configured to enable in part communication with and by the system, one or more applications, one or more service modules 526 configured to implement aspects of the various services described herein, a cryptographic operation module 524 configured to perform various aspects of the disclosed embodiments (e.g., cryptographic key, signature, and/or MAC generation operations, key management operations, etc.), and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, systems, services, and/or components presented in connection with the figures and/or associated description within the scope of the inventive body of work, and that the examples presented in the figures and described herein are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein but may be modified within the scope and equivalents of the appended claims.

The invention claimed is:

1. A method for managing a managed asset associated with a physical product performed by a token rights management service executing on a system comprising a processor and a non-transitory computer-readable storage medium storing instructions that, when executed by the processor, cause the system to perform the method, the method comprising:

receiving, by the token rights management service from a marketplace service, a tag identifier associated with the physical product, a first value generated by a tag associated with the physical product, a nonce value, and an access token;

retrieving, by the token rights management service, rightsholder identification information and an encrypted secure key associated with the tag identifier;

decrypting the encrypted secure key to generate a secure key;

validating, by the token rights management service, the access token and the first value, wherein validating the first value comprises querying a tag service of the token rights management service with the tag identifier, the first value, the nonce value, and the secure key;

querying, by the token rights management service in response to validating the access token, a trusted ledger service using a connector service of the token rights management service to determine whether the rightsholder identification information, the tag identifier, and the encrypted secure key are associated in an entry in a trusted ledger maintained by the trusted ledger service, the trusted ledger service executing on a separate system than the system executing the token rights management service;

receiving, by the connector service from the trusted ledger service, a first indication, the first indication indicating that the rightsholder identification information, the tag identifier, and the encrypted secure key are associated in an entry in the trusted ledger;

generating, by the token rights management service in response to receiving the first indication, a validation message, the validation message comprising a signed value generated based on the nonce value, a timestamp generated by the token rights management service, the rightsholder identification information, and the tag identifier; and transmitting the validation message to the marketplace service validating the physical product.

2. The method of claim 1, wherein the tag identifier is associated with a secure tag included in the physical product.

3. The method of claim 2, wherein the secure tag comprises a near field communication tag.

4. The method of claim 1, wherein the first value comprises a message authentication code value.

5. The method of claim 1, wherein validating the first value further comprises receiving a validation response from the tag service.

6. The method of claim 5, wherein the tag service comprises a service of the token rights management service and the validation response further comprises the timestamp.

7. The method of claim 1, wherein the rightsholder identification and the encrypted secure key are retrieved from a secure database.

8. The method of claim 7, wherein the secure database is managed on the same system as the token rights management service.

9. The method of claim 7, wherein the secure database is managed by a secure database service executing on a separate system than the system executing the token rights management service and the system executing the trusted ledger service.

10. The method of claim 1, wherein the physical product comprises a shoe.

11. The method of claim 1, wherein the trusted ledger comprises a trusted immutable distributed assertion ledger.

12. The method of claim 1, wherein the trusted ledger comprises a blockchain ledger.

13. The method of claim 1, wherein the method further comprises retrieving, by the token rights management service, metadata associated with the secure tag identifier.

14. The method of claim 13, wherein the metadata comprises metadata associated with the physical product.

15. The method of claim 13, wherein the metadata comprises contact information associated with the rightsholder identification information.

16. The method of claim 15, wherein the validation message further comprises the metadata.

17. The method of claim 1, wherein the tag identifier is obtained by the marketplace service from a tag reader system.

18. The method of claim 17, wherein the tag reader system obtains the tag identifier from a tag included in the physical product.

19. The method of claim 1, wherein the tag comprises a virtual digital tag identified by a watermark included on the physical product.

* * * * *